(12) United States Patent
Aiko et al.

(10) Patent No.: US 7,428,945 B2
(45) Date of Patent: Sep. 30, 2008

(54) HYDRAULIC POWER STEERING APPARATUS

(75) Inventors: Satoshi Aiko, Haga-gun (JP); Hiroki Iwano, Haga-gun (JP)

(73) Assignee: Showa Corporation, Gyoda-shi, Saitama (JP)

( * ) Notice: Subject to any disclaimer, the term of this patent is extended or adjusted under 35 U.S.C. 154(b) by 326 days.

(21) Appl. No.: 11/451,944

(22) Filed: Jun. 12, 2006

(65) Prior Publication Data

US 2007/0095599 A1     May 3, 2007

(30) Foreign Application Priority Data

Oct. 4, 2005  (JP) ............................. 2005-291760

(51) Int. Cl.
*B62D 5/08* (2006.01)
(52) U.S. Cl. ...................................... 180/441
(58) Field of Classification Search ............... 180/441, 180/417; 137/215, 246.16, 516.29
See application file for complete search history.

(56) References Cited

U.S. PATENT DOCUMENTS

| | | | | |
|---|---|---|---|---|
| 4,463,819 A | * | 8/1984 | Becker et al. | ............ 180/441 |
| 5,778,756 A | * | 7/1998 | Haga et al. | ............ 91/441 |
| 6,478,549 B1 | * | 11/2002 | Aden et al. | ............ 417/300 |
| 6,543,473 B2 | * | 4/2003 | Miyazaki | ............ 137/493 |
| 6,546,839 B1 | | 4/2003 | Jamra et al. | |
| 6,659,127 B2 | | 12/2003 | Keast | |
| 6,779,625 B2 | * | 8/2004 | Sonoda et al. | ............ 180/422 |
| 2005/0161278 A1 | * | 7/2005 | Harnischfeger et al. | ..... 180/441 |
| 2006/0070792 A1 | * | 4/2006 | Soeda | ............ 180/422 |
| 2006/0175122 A1 | * | 8/2006 | Okabe | ............ 180/441 |

FOREIGN PATENT DOCUMENTS

JP      2003-165454      6/2003

* cited by examiner

*Primary Examiner*—Tony H. Winner
(74) *Attorney, Agent, or Firm*—Osha Liang LLP

(57) ABSTRACT

A hydraulic power steering apparatus is provided with a check valve regulating a back flow of a working fluid from a power cylinder mechanism to a hydraulic pump side. A valve element slidably accommodated within a valve body of the check valve has three guide portions protruding to an outer side in a diametrical direction. A valve internal oil path in which the working fluid circulates by a pair of guide portions adjacent in a peripheral direction is formed in the valve element. The guide portion is constituted by a slidable contact portion having a sidable contact surface surface contacted with an inner peripheral surface of the valve body, and a coupling portion coupling a base body portion and the sidable contact portion. A width (W1) in a peripheral direction of the sidable contact surface is larger than a width in the peripheral direction of the coupling portion.

19 Claims, 5 Drawing Sheets

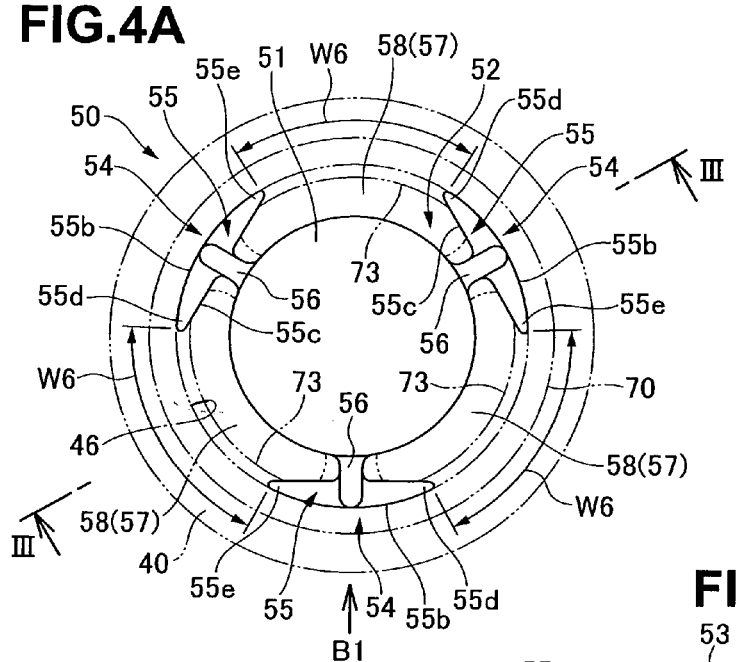
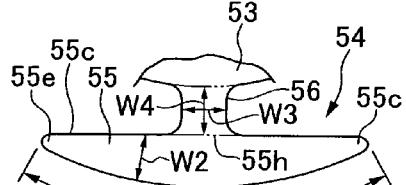
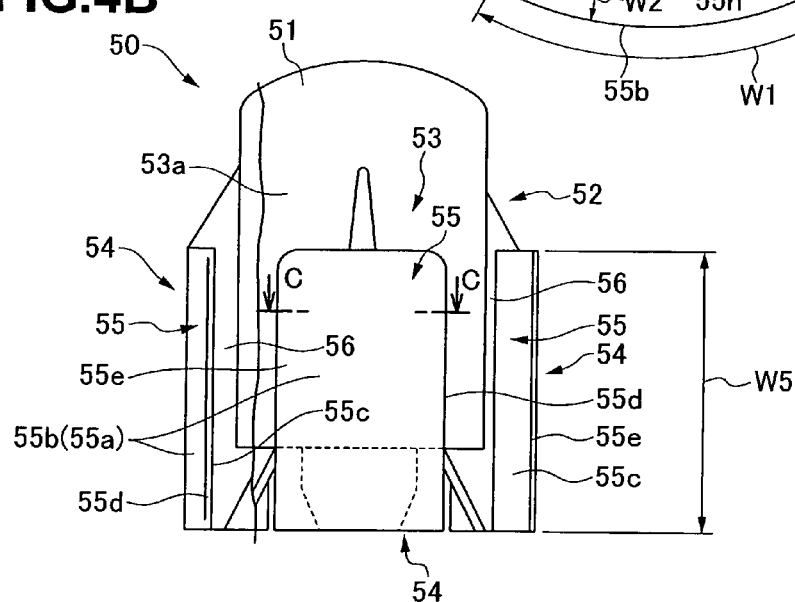

HYDRAULIC POWER STEERING APPARATUS

BACKGROUND OF THE INVENTION

1. Field of the Invention

The present invention relates to a hydraulic power steering apparatus used in a vehicle, and more particularly to a hydraulic power steering apparatus provided with a check valve regulating a back flow of a working fluid from a hydraulic actuator generating a steering assist force to a hydraulic pump side.

2. Description of the Related Art

In a hydraulic power steering apparatus provided with a hydraulic actuator generating a steering assist force, in order to prevent a phenomenon (a so-called kickback phenomenon) that a working fluid supplied to the hydraulic actuator flows back to a hydraulic pump side and a steering wheel is moved based on an external force applied to a tire wheel at a time when a vehicle runs on a curb or the like, there is a case that a check valve inhibiting the back flow of the working fluid is provided. Further, in the check valve mentioned above, there has been known a structure in which a valve element slidably accommodated within a valve body has a plate-like guide portion which is surface contacted with an inner peripheral surface of the valve body (refer, for example, to Japanese Patent Application Laid-open No. 2003-165454 (patent document 1)).

In this case, in the structure in which the valve element has the plate-like guide portion which is surface contacted with the inner peripheral surface of the valve body, since a width in a peripheral direction of the guide portion is approximately uniform all over the guide in a diametrical direction including a slidable contact surface of the guide portion brought into slidable contact with the inner peripheral surface, the valve element is hardly inclined with respect to a center axis of the valve body based on a flow of the working fluid. In order to move in parallel to the center axis, it is necessary to increase a number of the guide portion while suppressing an increase of the sliding resistance. However, if the number of the guide portion is increased, the width in the peripheral direction of a valve internal oil path formed by a pair of guide portions adjacent to each other in the peripheral direction becomes small, and a flow path resistance becomes large.

SUMMARY OF THE INVENTION

One or more embodiments of the present invention improve an effect of preventing a slope of a valve element with respect to a center axis of a valve body in a check valve and suppress an increase of a flow path resistance in a valve internal oil path as much as possible, in a hydraulic power steering apparatus. Further, one or more embodiments improve the effect of preventing the slope of the valve element by increasing a rigidity of a sidable contact portion.

Embodiments of the present invention relates to a hydraulic power steering apparatus comprising: a hydraulic actuator generating a steering assist force by a working fluid supplied from a hydraulic pump; a hydraulic control valve controlling a supply and a discharge of the working fluid with respect to the hydraulic actuator; a check valve arranged in a supply oil path of the working fluid from the hydraulic pump to the hydraulic control valve and regulating a back flow of the working fluid from the hydraulic actuator to the hydraulic pump side; and the check valve having a valve body provided with a valve seat, and a valve element slidably accommodated within the valve body so as to freely seat on the valve seat. The valve element has a plurality of guide portions provided in a base body portion of the valve element so as to extend along a center axis and protrude to an outer side in a diametrical direction from the base body portion at an interval in a peripheral direction, a valve internal oil path in which the working fluid circulates is formed in the valve element by a pair of the guide portions adjacent in the peripheral direction, each of the guide portions is constituted by a sidable contact portion having an outer peripheral surface structuring a sidable contact surface which is surface contacted with an inner peripheral surface of the valve body, and a coupling portion extending to an outer side in the diametrical direction from the base body portion and coupling the base body portion and the slidable contact portion, and a width in the peripheral direction of the sidable contact surface is larger than a width in the peripheral direction of the coupling portion.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIG. 4A is a plan view of the valve element of the check valve in FIG. 3, in which the valve body shown by a two-dot chain line is shown as a cross sectional view as seen from an arrow IV-IV in FIG. 3;

FIG. 4B is a side elevational view as seen from an arrow B1 in FIG. 4A and partly seen from an arrow B2 in FIG. 4A;

FIG. 4C is an enlarged cross sectional view of a main portion as seen from an arrow C-C in FIG. 4B.

DESCRIPTION OF THE PREFERRED EMBODIMENTS

A description will be given below of embodiments in accordance with the present invention with reference to FIGS. 1 to 5.

Figure 1:
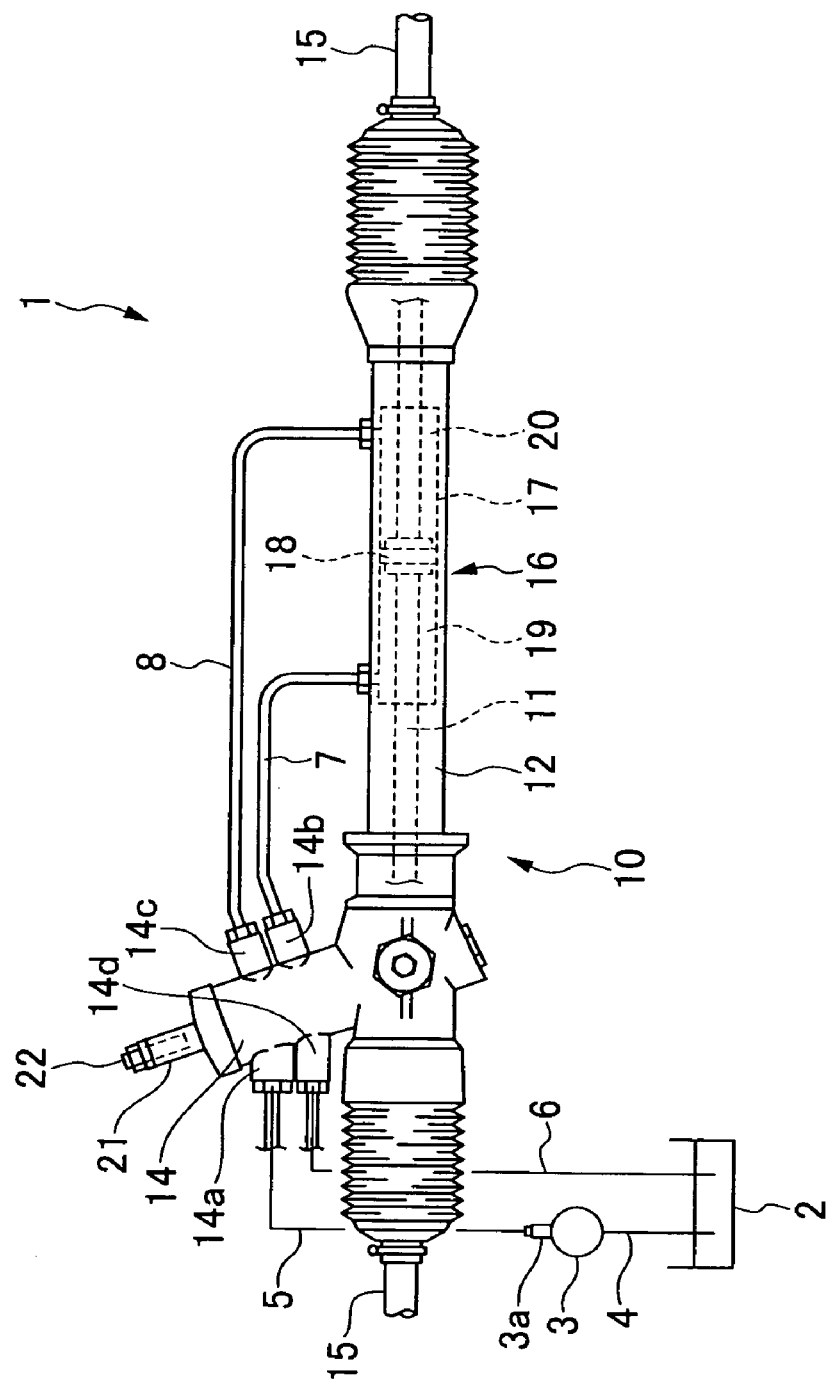
FIG. 1 is an entirely schematic view showing a part of a hydraulic power steering apparatus for a vehicle corresponding to an embodiment in accordance with the present invention by a cross sectional view.

Referring to FIG. 1, a rack and pinion type hydraulic power steering apparatus 1 for a vehicle is provided with a reservoir 2 reserving a working fluid, a hydraulic pump 3, a gear box 10, a suction pipe 4 connecting the reservoir 2 and the hydraulic pump 3, a supply pipe 5 constituted by a conduit pipe connecting the hydraulic pump 3 and the gear box 10, and a circulating pipe 6 connecting the gear box 10 and the reservoir 2.

The hydraulic pump 3 driven by an internal combustion engine mounted on the vehicle supplies the working fluid which is sucked through the suction pipe 4 from the reservoir 2 so as to become high pressure, to a power cylinder mechanism 16 via the supply pipe 5 and a hydraulic control valve 13 (refer to FIG. 2) of the gear box 10. The working fluid discharged from the power cylinder mechanism 16 flows into the reservoir 2 via the hydraulic control valve 13 and the circulating pipe 6.

The gear box 10 is provided with a tubular housing 12 accommodating the rack shaft 11 so as to be movable in a lateral direction of the vehicle, and a valve housing 14 provided close to one end portion of the housing 12 and accommodating the hydraulic control valve 13. One end portions of a pair of tie rods 15 are respectively coupled to both end portions of the rack shaft 11 via a pair of ball joints, and the other end portions of the respective tie rods 15 are coupled to steered wheels via an interlocking mechanism (not shown).

In this case, in these embodiments, "right and left" mean right and left in the vehicle.

An intermediate portion of the housing 11 is provided with the power cylinder mechanism 16 serving as a hydraulic actuator. The power cylinder mechanism 16 is provided with a power cylinder 17 constituted by a part of the housing 12, a power piston fixed to the rack shaft 11 and fitted within the power cylinder 17 so as to be slidable in an axial direction of the rack shaft 11, and a first oil chamber 19 and a second oil chamber 20 respectively formed in both sides of the power piston 18.

Figure 2:
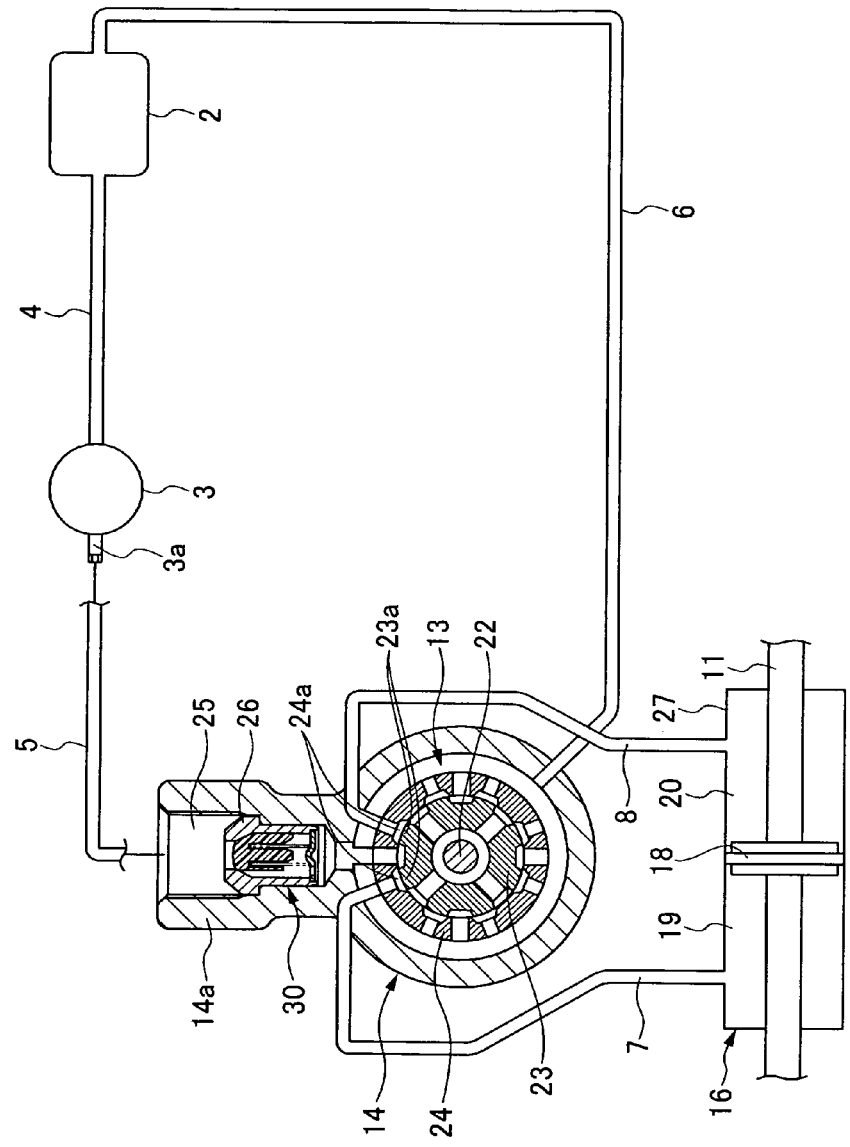
FIG. 2 is an explanatory view around an oil path and a check valve of the power steering apparatus in FIG. 1.

Referring to FIG. 2 in conjunction, an input shaft 21 and an output shaft (not shown) are rotatably accommodated in the valve housing 14. The input shaft 21 is coupled to a steering wheel (not shown) operated by a driver via a coupling mechanism, and the output shaft is coupled to the input shaft 21 via a torsion bar 22 integrally connected to the input shaft 21 so as to be relatively rotatable. A pinion engaging with a rack formed in the rack shaft 11 is formed within the housing 12 in a lower end portion of the output shaft. A hydraulic control valve 13 is constituted by a rotary valve controlling a supply and a discharge of the working fluid between the hydraulic pump 3 and the reservoir 2, and the power cylinder mechanism 16. The hydraulic control valve 13 is provided with a valve shaft 23 integrally rotating with the input shaft 21, and a valve sleeve 24 accommodating the valve shaft 23 and integrally rotating the output shaft. The hydraulic control valve 13 controls the supply and the discharge of the working fluid with respect to the first and second oil chambers 19 and 20 in correspondence to a relative rotation between a valve shaft 23 having a plurality of lands 23a and a valve sleeve 24 having a control groove 24a. Further, the valve housing 14 is provided with an inlet port portion 14a having an inlet port 25 to which the supply pipe 5 is connected and the working fluid from the hydraulic pump 3 flows, output port portions 14b and 14c to which first and second oil pipes 7 and 8 respectively communicating with the first and second oil chambers 19 and 20 are respectively connected, and an output port portion 14d to which the circulating pipe 6 is connected.

Further, when the steering wheel is operated, the rack shaft 11 is moved in a lateral direction by the pinion engaging with the rack so as to steer the right and left steered wheels. At this time, the hydraulic control valve 13 is activated in correspondence to a torsional amount of the torsion bar 22 due to a difference of rotation between the input shaft 21 and the output shaft generated based on a reaction force from a road surface caused by a road surface resistance or the like, that is, a steering torque, and the working fluid from the hydraulic pump 3 is supplied to the first oil chamber 19 (or the second oil chamber 20) via the supply pipe 5, the hydraulic control valve 13 and the oil pipe 7 (or the oil pipe 8) in correspondence to an operating direction of the steering wheel. On the other hand, the working fluid in the second oil chamber 20 (or the first oil chamber 19) is discharged to the reservoir 2 via the oil pipe 8 (or the oil pipe 7), the hydraulic control valve 13 and the circulating pipe 6, a hydraulic pressure in correspondence to the steering torque is generated in the first and second oil chambers 19 and 20 of the power cylinder mechanism 16, and a steering assist force generated based on a differential pressure between both the oil chambers 19 and 20 is applied to the rack shaft 11, whereby a steering force of the driver is lightened.

As mentioned above, the gear box 10 is provided with the input shaft 21, the torsion bar 22, the output shaft, the pinion, the rack shaft 13, the hydraulic control valve 13 and the power cylinder mechanism 16. Further, a steering torque transmission mechanism constituted by the steering wheel, the coupling mechanism, the input shaft 21, the torsion bar 22, the output shaft and the pinion transmits the steering torque applied to the steering wheel by the driver to the rack shaft 11. Further, the discharge port portion 3a, the inlet port portion 14a, the supply pipe 5 and a flare seat 26 correspond to an oil path forming member constituting a supply oil path of the working fluid for supplying the working fluid discharged from the hydraulic pump 3 to the power cylinder mechanism 16 via the hydraulic control valve 13.

Figure 3:
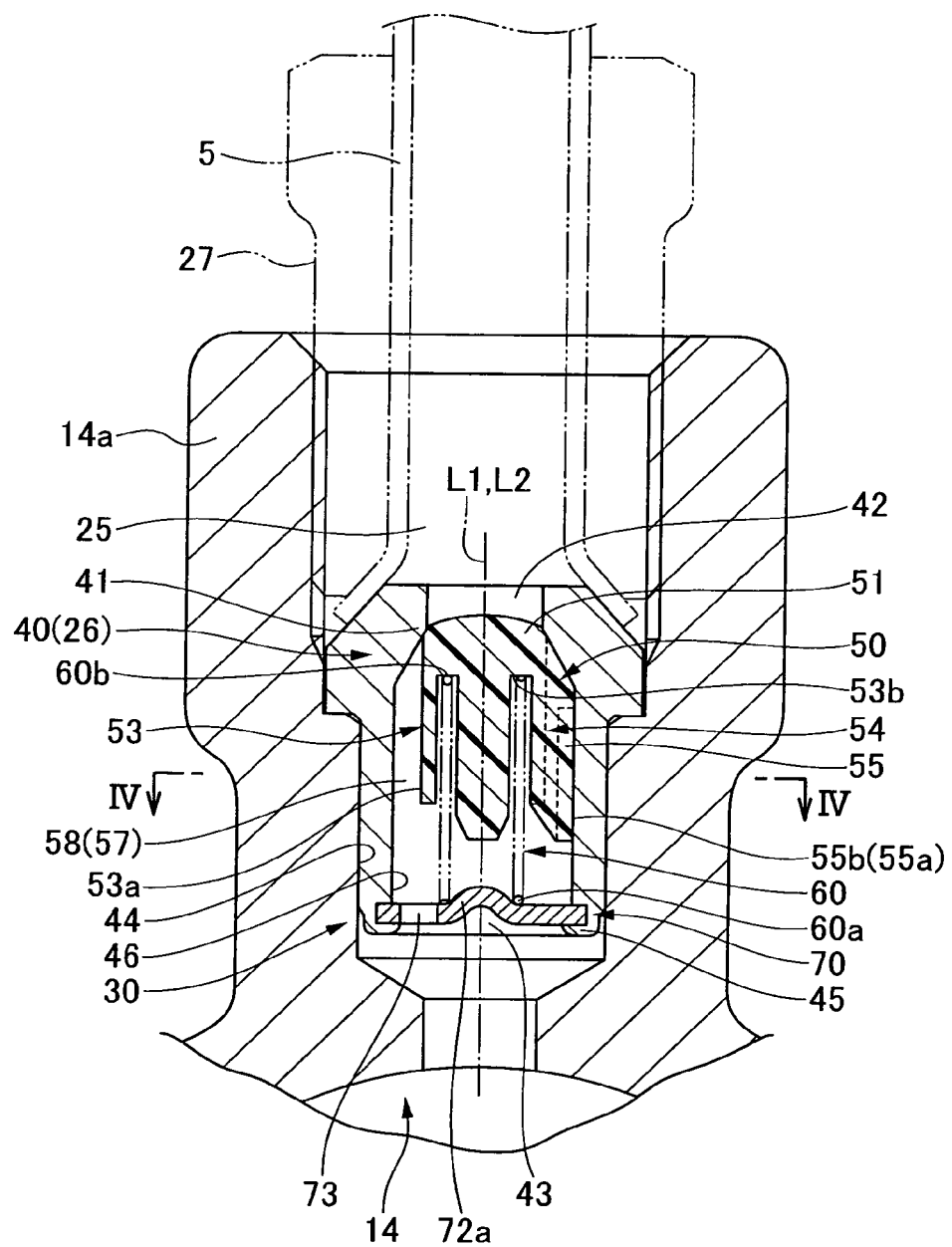
FIG. 3 is an enlarged view of a main portion around the check valve in FIG. 2 at a time of closing the valve, in which a valve element is shown as a cross sectional view as seen from an arrow III-III in FIG. 4A.

Referring to FIGS. 2 and 3, since the flare seat 26 is inserted to the inlet port 25 of the inlet port portion 14a of the valve housing 14 accommodating the hydraulic control valve 13, and an expanded leading end portion of the supply pipe 5 is pinched between the flare seat 26 and a flare nut 27 screwed into the inlet port portion 14a, the flare seat 26 is connected to the inlet port portion 14a, and the supply pipe 5 is connected to the flare seat 26.

The inlet port portion 14a is provided with a check valve 30 built-in. The check valve 30 is opened at a time when the working fluid discharged from the hydraulic pump 3 and supplied to the inlet port 25 via the supply pipe 5 has a hydraulic pressure higher than a predetermined value, thereby allowing the working fluid to be supplied to the first and second oil chambers 19 and 20 of the power cylinder mechanism 16 via the hydraulic control valve 13, and regulates the backflow to the hydraulic pump 3 side of the working fluid in the first and second oil chambers 19 and 20 generated by an application of the external force applied to the steered wheels at a time when the vehicle runs on the curb to the power piston 18 through the rack shaft 11, inhibits the backflow in this embodiment. Based on the check valve 30 arranged within the supply oil path formed by the inlet port portion 14a, it is possible to prevent a phenomenon that the working fluid in the first and second oil chambers 19 and 20 flows back to the hydraulic pump 3 side so as to adversely affect the steering torque transmission mechanism, for example, a kickback phenomenon.

A description will be given below mainly of the check valve 30 with reference to FIGS. 3 to 5.

Referring to FIG. 3, the check valve 30 has a valve body 40 constituted by the flare seat 26 and provided with a valve seat 41, a valve element 50 slidably accommodated within the valve body 40 and freely seating on the valve seat 41, a valve spring 60 constituted by a compression coil spring energizing the valve element 50 in a valve closing direction based on a spring force in such a manner that the valve element 50 seats on the valve seat 41, and a spring receiver 70 holding one end portion 60a of the valve spring 60.

In the valve body 40, there are formed an inlet 42 into which the working fluid flowing in a forward direction toward the power cylinder mechanism 16 (refer to FIG. 2) from the hydraulic pump 3 flows, an outlet 43 from which the working fluid flowing in the forward direction flows out toward the hydraulic control valve 13 (refer to FIG. 2), an accommodating hole 44 in which the valve element 50 is accommodated and the working fluid circulates, and a spring receiver holding portion 45.

The accommodating hole 44 corresponds to an accommodating space in which the valve element 50 is accommodated so as to be movable in a direction (hereinafter, refer to "axial direction") of a center axis L1 (a center axis of the valve body 40) of the accommodating hole 44, and is defined by an inner peripheral surface 46 of the valve body 40. Further, the inner peripheral surface 46 is constituted by a columnar surface (refer to FIG. 4A) in which the center axis L1 is set as a center axis thereof, within a range in an axial direction with which at least sidable contact surface 55b mentioned below is brought into sidable contact. Further, the valve element 50 is guided by a guide portion 54 mentioned below, and is arranged within the valve body 40 in such a manner that a center axis L2 of the valve element 50 coincides with the center axis L1.

Referring to FIGS. 4A to 4C in conjunction, the valve element 50 entirely formed by a synthetic resin has a control portion 51 opening and closing the inlet 42 by moving close to and away from the valve seat 41, and a support portion 52 positioned in a downstream side from the control portion 51 with respect to the working fluid flowing in the forward direction, and slidably supporting the valve element 50 in parallel to the center axis L1 within the accommodating hole 44, and is structured such that the control portion 51 and the support portion 52 are integrally formed.

The support portion 52 is constituted by a columnar base body portion 53, and a predetermined plural number of, three in this case, blade-shaped guide portions 54. The guide portions 54 extend to an outer peripheral surface 53a constituted by a columnar surface of the base body portion 53 along the center axis L2 and are provided so as to protrude to an outer side in a diametrical direction from the outer peripheral surface 53a at a uniform interval in a peripheral direction. All the guide portions 54 have the same shape. Further, the same predetermined number of, three in this case, grooves 57 are formed between the outer peripheral surface 53a and the inner peripheral surface 46, at a uniform interval in a peripheral direction while holding the guide portion 54 therebetween. The grooves 57 are formed in such a manner that the base end portion 53 is set to a bottom wall in the diametrical direction and a pair of guide portions 54 adjacent in the peripheral direction are set to both side walls. In this case, each of the grooves 57 forms a valve internal oil path 58 in which the working fluid circulates within the valve body 40, in cooperation with the valve body 40. Further, the center axis of the base body portion 53 coincides with the center axis L2 of the valve element 50.

In this case, in the specification and claims, the diametrical direction and the peripheral direction respectively mean a diametrical direction and a peripheral direction around the center axes L1 and L2 of the valve body 40 or the valve element 50, the cross section means a cross section in a plane orthogonal to the center axis L1 of the valve body 40 with regard to the valve body 40, and means a cross section in a plane orthogonal to the center axis L2 of the valve element 50 with regard to the valve element 50.

Each of the guide portions 54 is structured by integrally forming a sidable contact portion 55 having an outer peripheral surface 55a constructing a slidable contact surface 55b surface contacted with the inner peripheral surface 46 of the valve body 40, and a coupling portion 56 extending to an outer side in the diametrical direction from the outer peripheral surface 53a so as to couple the base body portion 53 and the sidable contact portion 55. The sidable contact surface 55b is constituted by a columnar surface having a slightly smaller diameter than the inner peripheral surface 46. In this embodiment, a width W1 in a peripheral direction of the slidable contact surface 55b constituted by an entire surface of the outer peripheral surface 55a is larger than a width W3 in a peripheral direction of the coupling portion 56. Further, in this embodiment, the width W1 in the peripheral direction is about eightfold of the width W3 in the peripheral direction.

As shown in FIG. 4A, cross sectional shapes of the coupling portion 56 and the sidable contact portion 55 are line symmetrical shapes in which a straight line passing through the center axis L2 is set to a common symmetrical line. Further, the cross sectional shape including the sidable contact surface 55b in the guide portion 54 is approximately formed in a T shape, and the sidable contact portion 55 is formed in the same cross sectional shape all over the axial direction.

In this case, as a matter of convenience, it is assumed that a boundary between the base body portion 53 and the coupling portion 56 corresponds to a virtual surface (a columnar surface in which the center axis L2 is set to a center axis in this embodiment) including the outer peripheral surface 53a of the base body portion 53 in the cross sectional shape, and a boundary between the sidable contact portion 55 and the coupling portion 56 corresponds to a virtual surface (a virtual plane brought into contact with both end portions 55d and 55e in this embodiment) including a facing surface 55c mentioned below.

The width W1 in the peripheral direction of the sidable contact surface 55b is approximately equal to an interval W6 in the peripheral direction between a pair of sidable contact surfaces 55b adjacent in the peripheral direction. More specifically, a rate R1 of the interval W6 in the peripheral direction with respect to the width W1 in the peripheral direction is set to $0.8 < R1 < 1.2$, and the rate R1 is set to be slightly larger than 1 in this embodiment. Since the rate R1 is 0.8 or more, the reduction of the flow path area of the valve interval oil path 58 by the guide portion 54 is suppressed.

Further, since the rate R1 is 1.2 or less, the slidable contact surface 55b becomes larger, and the effect of preventing the valve element 50 from being sloped with respect to the center axis L1 due to the flow of the working fluid is improved. Accordingly, a support stability of the valve element 50 is secured.

Further, in the slidable contact portion 55, the facing surface 55c facing to the base body portion 53 in the diametrical direction corresponds to a surface included in the virtual plane which is brought into contact with both end portions 55d and 55e of the sidable contact portion 55 in the peripheral direction and is in parallel to the center axis L2. Accordingly, the width W2 in the diametrical direction of the sidable contact portion 55 becomes larger in proportion as moving close to the coupling portion 56 from both end portions 55d and 55e in the peripheral direction. Further, the width W4 in the diametrical direction of the coupling portion 56 is larger than a minimum value of the width W3 in the peripheral direction of the coupling portion 56, and is smaller than a maximum value of the width W2 in the diametrical direction of the sidable contact portion 55. In this embodiment, the maximum value of the width W2 in the diametrical direction exists in a connecting portion 55h to the coupling portion 56 in the sidable contact portion 55.

A rate R2 of the width W5 in the axial direction of the slidable contact surface 55b with respect to the width W1 in the peripheral direction of the sidable contact surface 55b is set to $1 < R2 < 2$, and is preferably set to $1.5 < R2 < 1.8$. Since the rate R2 is 1 or more, the effect of preventing the valve element 50 from being sloped with respect to the center axis L1 due to the flow of the working fluid is improved, and the support stability of the valve element 50 is secured. Further, since the rate R2 is 2 or less, the increase of the sidable resistance with respect to the valve element 50 is suppressed.

Referring to FIG. 3, a cylindrical groove 53b in which the center axis L2 is set to a center axis is formed in the base body portion 53, and the other end portion 60b of the valve spring 60 is held so as to be brought into contact with the base body portion 53 in a state of being accommodated within the groove 53b.

Figure 5:
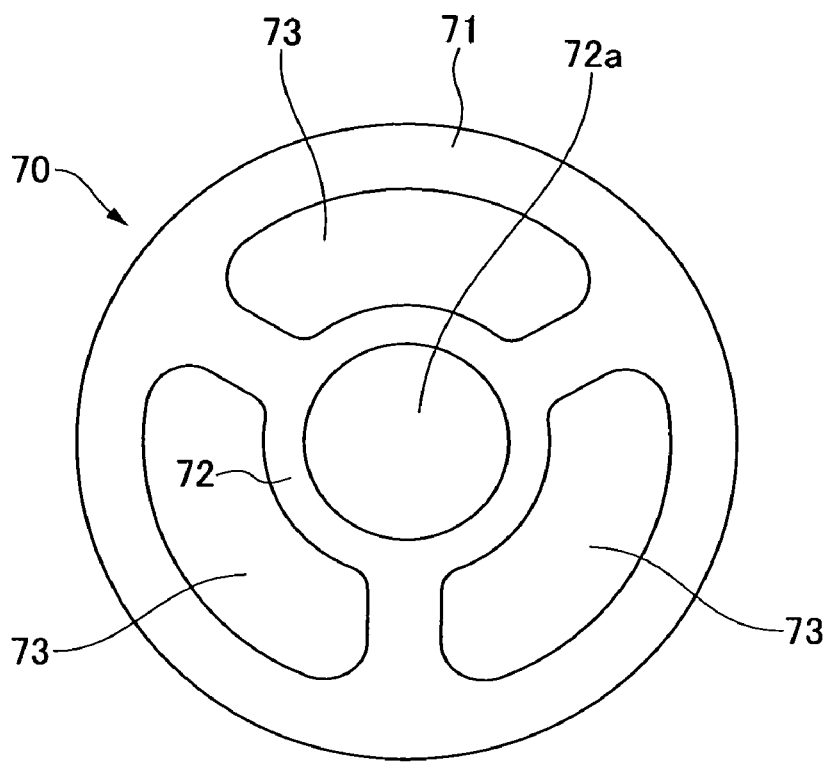
FIG. 5 is a plan view of a spring receiver of the check valve in FIG. 3.

Referring to FIGS. 3, 4A and 5, a plurality of, three in this embodiment openings 73 constituted by arcuate oblong holes are formed between an outer peripheral portion 71 and a center portion 72, in a disc-like spring receiver 70 fixed to the body 40 by the spring receiver holding portion 45 at a uniform interval in a peripheral direction so as to be positioned within the accommodating hole 44. The opening 73 has a portion which always laps over the groove 57 regardless of the position of the valve element 50 around the center axis L2 as seen from the direction of the center axis L1, as shown in FIG. 4A. Accordingly, when opening the check valve 30, a main stream occupying a major part of the working fluid flowing from the inlet 42 circulates the valve internal oil path 58 and the opening 73 along the center axis L2 so as to reach the outlet 43 without coming through the valve spring 60 in the diametrical direction.

The center portion 72 has a semispherical protruding portion 72a protruding toward the valve element 50 within the internal space of the valve spring 60. The protruding portion 72a inhibits the movement of the valve spring 60 in the diametrical direction, and functions as a stopper for defining a maximum moving amount of the valve element 50 in the valve opening direction based on the contact of the center portion 53b of the base body portion 53 with the protruding portion 72a at a time of opening the check valve 30.

Next, a description will be given of an operation and an effect of embodiments structured as mentioned above.

In the case that the external force applied to the steered wheel intends to flow back the working fluid in the first oil chamber 19 or the second oil chamber 20 to the hydraulic pump 3 side at a time when the vehicle runs on the curb or the like, the back flow is inhibited based on the closing of the check valve 30, and it is possible to prevent the kickback phenomenon from being generated.

In the power steering apparatus 1, the valve element 50 of the check valve 30 inhibiting the back flow of the working fluid from the power cylinder mechanism 16 to the hydraulic pump 3 has three guide portions 54, the valve internal oil path 58 is formed in the valve element 50, and each of the guide portions 54 is constituted by the sidable contact portion 55 having the sidable contact surface 55b surface contacted with the inner peripheral surface 46 of the valve body 40, the coupling portion 56 coupling the base body portion 53 and the sidable contact portion 55, and the width W1 in the peripheral direction of the slidable contact surface 55b is larger than the width W3 in the peripheral direction of the coupling portion 56. Accordingly, the valve element 50 slides on the wide slidable contact surface 55b having the larger width W1 in the peripheral direction than the width W3 in the peripheral direction of the coupling portion 56 so as to be supported to the valve body 40, by means of the guide portions 54. Therefore, even in the case that the number of the guide portions 54 is small, the valve element 50 is inhibited from being sloped with respect to the center axis L1 of the valve body 40 on the basis of the flow of the working fluid, and moves in parallel to the center axis L1. Further, since it is possible to reduce the number of the guide portions 54, it is possible to make the flow path resistance in the valve internal oil path 58 small. As a result, since the effect of preventing the valve element 50 from being sloped is improved by the guide portions 54 having the wide sidable contact surface 55b, and the valve element 50 is stably supported within the valve body 40, the operation of the check valve 30 becomes stable. Further, the reduction of the flow path resistance in the valve internal oil path 58 contributes to an improvement of an actuation response of the power steering apparatus 1.

Since the width W1 in the peripheral direction of the sidable contact surface 55b is approximately equal to the interval W6 in the peripheral direction, the width W1 in the peripheral direction is enough large to be approximately equal to the interval W6 in the peripheral direction.

Accordingly, the effect of preventing the valve element 50 from being sloped can be further improved. As a result, since the width W1 in the peripheral direction of the wide sidable contact surface 55b is large, it is possible to further improve the effect of preventing the valve element 50 from being sloped by the reduced number of guide portions 54.

Since the width W2 in the diametrical direction of the slidable contact portion 55 becomes larger in proportion as the slidable contact portion 55 goes closer to the coupling portion 56 from both end portions 55d and 55e, a rigidity of the sidable contact portion 55 is improved in proportion as the sidable contact portion 55 goes closer to the coupling portion 56. Accordingly, the valve element 50 tends to be hardly sloped, and the valve element 50 is stably supported along the center axis L1 even at a time when the flow rate of the working fluid is changed. Further, since the width W2 in the diametrical direction becomes smaller in proportion as the width W2 goes closer to the end portions 55d and 55e in the peripheral direction, it is possible to enlarge a flow path area of the valve internal oil path 58. As a result, since the rigidity of the sidable contact portion 55 can be improved, it is possible to contribute to an improvement of the effect of preventing the valve element 50 from being sloped. Further, since the width W2 in the diametrical direction in both end portions 55d and 55e of the sidable contact portion 55 is small, it is possible to suppress an increase of the flow path resistance in the valve internal oil path 58, and an actuation response of the power steering apparatus 1 can be improved.

Since the width W4 in the diametrical direction of the coupling portion 56 is larger than the minimum value of the width W3 in the peripheral direction, and is smaller than the width W2 in the diametrical direction in the coupling portion 55h of the sidable contact portion 55, a desired rigidity of the coupling portion 56 is secured based on the width W4 in the diametrical direction of the coupling portion 56. Further, since the width W2 in the diametrical direction in the coupling portion 55h is larger than the width W4 in the diametrical direction, the rigidity of the sidable contact portion 55 is improved, and the valve element 50 is hard to be sloped, thereby contributing to the improvement of the effect of preventing the valve element 50 from being sloped. Further, since the minimum value of the width W3 in the peripheral direction of the coupling portion 56 is smaller than the width W4 in the diametrical direction of the coupling portion 56, it is possible to suppress the matter that the flow path area of the valve internal oil path 58 becomes smaller by the coupling portion 56. Therefore, it is possible to suppress an increase of the flow path resistance of the valve internal oil path 58, and it is possible to improve the actuation response of the power steering apparatus 1.

Since a rate R3 of the width W5 in the axial direction of the slidable contact surface 55b with respect to the width W1 in the peripheral direction of the sidable contact surface 55b is set to 1<R3<2, the sidable contact surface 55b has the width W5 in the axial direction which is the width W1 or more in the peripheral direction. Accordingly, the slope of the valve element 50 is suppressed. Further, since the width W5 in the axial direction is twice or less of the width W1 in the peripheral direction, an increase of the sliding resistance is suppressed. As a result, in addition that the sliding resistance of the valve element 50 is suppressed, the effect of preventing the valve element 50 from being sloped is improved.

A description will be given of embodiments in which a partial structure as mentioned above is modified.

The valve body 40 structuring the check valve 30 is constituted by the flare seat 26 in the embodiment mentioned above, however, it may be constituted by a member structuring the oil path forming member forming the supply oil path or a member which is independently provided from the oil path forming member mentioned above and simply functions as a part of the check valve 30. The guide portions 54 may be constituted by an independent member from the base body portion 53 so as to be integrally connected to the base body portion 53.

The sidable contact surface 55b may be completely divided in the peripheral direction or the axial direction by one groove or a plurality of grooves provided in the outer peripheral surface 55a. Further, the guide portions 54 may be completely divided into a plurality of pieces in the axial direction. In the case that the sidable contact surface 55b or the guide portions 54 is divided, the width W1 in the peripheral direction or the width W5 in the axial direction corresponds to a total of the widths in the peripheral direction of the divided portions or the widths in the axial direction thereof.

As mentioned above, in accordance with embodiments of the present invention, there is provided a hydraulic power steering apparatus comprising:

a hydraulic actuator generating a steering assist force by a working fluid supplied from a hydraulic pump;

a hydraulic control valve controlling a supply and a discharge of the working fluid with respect to the hydraulic actuator;

a check valve arranged in a supply oil path of the working fluid from the hydraulic pump to the hydraulic control valve and regulating a back flow of the working fluid from the hydraulic actuator to the hydraulic pump side; and the check valve having a valve body provided with a valve seat, and a valve element slidably accommodated within the valve body so as to freely seat on the valve seat, wherein the valve element has a plurality of guide portions provided in a base body portion of the valve element so as to extend along a center axis and protrude to an outer side in a diametrical direction from the base body portion at an interval in a peripheral direction, a valve internal oil path in which the working fluid circulates is formed in the valve element by a pair of the guide portions adjacent in the peripheral direction, each of the guide portions is constituted by a slidable contact portion having an outer peripheral surface structuring a sidable contact surface which is surface contacted with an inner peripheral surface of the valve body, and a coupling portion extending to an outer side in the diametrical direction from the base body portion and coupling the base body portion and the slidable contact portion, and a width in the peripheral direction of the sidable contact surface is larger than a width in the peripheral direction of the coupling portion.

In accordance with this structure, since the valve element slides on the wide slidable contact surface having the larger width in the peripheral direction than the width in the peripheral direction of the coupling portion so as to be supported to the valve body by means of a plurality of guide portions, it is possible to suppress the matter that the valve element is sloped with respect to the center axis of the valve body due to the flow of the working fluid even in the case that the number of the guide portions is small, and the valve element moves in parallel to the center axis. Further, since it is possible to reduce the number of the guide portions, it is possible to make the flow path resistance in the valve internal oil path.

Further, in accordance with embodiments of the present invention, in the hydraulic power steering apparatus, the width in the peripheral direction of each of the sidable contact surfaces is approximately equal to an interval in a peripheral direction between a pair of the sidable contact surfaces adjacent in the peripheral direction.

In accordance with this structure, since the width in the peripheral direction of the sidable contact surface is larger in proportion as the width in the peripheral direction of the slidable contact surface becomes approximately equal to the interval in the peripheral direction, the effect of preventing the valve element from being sloped can be further improved. Further, since the width in the peripheral direction of the sidable contact surface is large, it is possible to prevent the valve element from being sloped even if the number of guide portions is small.

Further, in accordance with embodiments of the present invention, in the hydraulic power steering apparatus, the width in the diametrical direction of the sidable contact portion becomes larger in proportion as it goes closer to the coupling portion from both end portions of the sidable contact portion in the peripheral direction.

In accordance with this structure, since the rigidity of the sidable contact portion can be increased in proportion as the slidable contact portion goes closer to the coupling portion, the valve element is hard to be sloped, and the valve element is stably supported along the center axis even at a time when the flow rate of the working fluid is changed. Further, since the width in the diametrical direction becomes smaller in proportion as the sidable contact portion goes closer to the end portion in the peripheral direction, the flow path area of the valve internal oil path can be increased at that degree.

Further, in accordance with embodiments of the present invention, in the hydraulic power steering apparatus, the width in the diametrical direction of the coupling portion is larger than the minimum value of the width in the peripheral direction of the coupling portion, and is smaller than the width in the diametrical direction of a connecting portion of the sidable contact portion and the coupling portion.

In accordance with this structure, since a desired rigidity of the coupling portion is secured, and the width in the diametrical direction of the connecting portion to the coupling portion in the sidable contact portion is larger than the width in the diametrical direction of the coupling portion on the basis of the width in the diametrical direction of the coupling portion, the rigidity of the sidable contact portion is increased, and the valve element is hard to be sloped. Further, since the minimum value of the width in the peripheral direction of the coupling portion is smaller than the width in the diametrical direction of the coupling portion, it is possible to suppress the matter that the flow path area of the valve internal oil path becomes smaller by the coupling portion.

Further, in accordance with embodiments of the present invention, in the hydraulic power steering apparatus, a rate of the width in the axial direction of the sidable contact surface with respect to the width in the peripheral direction of the sidable contact surface is 1 or more and 2 or less.

In accordance with this structure, since the sidable contact surface has the width in the axial direction which is equal to or more than the width in the peripheral direction, the slope of the valve element is suppressed.

Further, since the width in the axial direction is twice or less of the width in the peripheral direction, the increase of the sliding resistance can be suppressed.

In accordance with embodiments of the present invention, the following effects can be obtained. In other words, the effect of preventing the valve element from being sloped is improved by the guide portion having the wide sidable contact surface. Since the valve element is stably supported within the valve body, the operation of the check valve becomes stable. Further, the reduction of the flow path resistance in the valve internal oil path contributes to the improvement of the actuation response of the power steering apparatus.

Further, in accordance with embodiments of the present invention, since the width in the peripheral direction of the wide sidable contact surface is large, it is possible to further improve the effect of preventing the valve element from being sloped by the reduced number of guide portions.

Further, in accordance with embodiments of the present invention, since the rigidity of the sidable contact portion is improved, it is possible to contribute to the improvement of the effect of preventing the valve element from being sloped. Further, since the width in the diametrical direction of both end portions of the sidable contact portion is small, it is possible to suppress the increase of the flow path resistance in the valve internal oil path, and the actuation response of the power steering apparatus can be improved.

Further, in accordance with embodiments of the present invention, since the rigidity of the sidable contact portion is improved, it is possible to contribute to the improvement of the effect of preventing the valve element from being sloped. Since the width in the peripheral direction of the coupling portion is small, it is possible to suppress the increase of the flow path resistance of the valve internal oil path, and it is possible to improve the actuation response of the power steering apparatus.

Further, in accordance with embodiments of the present invention, in addition that the sliding resistance of the valve element is suppressed, the effect of preventing the valve element from being sloped is improved.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A hydraulic power steering apparatus comprising:
    a hydraulic actuator generating a steering assist force by a working fluid supplied from a hydraulic pump;
    a hydraulic control valve controlling a supply and a discharge of the working fluid with respect to the hydraulic actuator;
    a check valve arranged in a supply oil path of the working fluid from the hydraulic pump to the hydraulic control valve and regulating a back flow of the working fluid from the hydraulic actuator to the hydraulic pump side; and
    the check valve having a valve body provided with a valve seat, and a valve element slidably accommodated within the valve body so as to freely seat on the valve seat,
    wherein
        the valve element has a plurality of guide portions provided in a base body portion of the valve element so as to extend along a center axis and protrude to an outer side in a diametrical direction from the base body portion at an interval in a peripheral direction,
        a valve internal oil path in which the working fluid circulates is formed in the valve element by a pair of the guide portions adjacent in the peripheral direction,
        each of the guide portions is constituted by a slidable contact portion having an outer peripheral surface structuring a sidable contact surface which is surface contacted with an inner peripheral surface of the valve body,
        a coupling portion extending to an outer side in the diametrical direction from the base body portion and coupling the base body portion and the slidable contact portion, and
        a width in the peripheral direction of the slidable contact surface is larger than a width in the peripheral direction of the coupling portion.

2. The hydraulic power steering apparatus as claimed in claim 1, wherein the width in the peripheral direction of each of the sidable contact surfaces is approximately equal to an interval in a peripheral direction between a pair of the sidable contact surfaces adjacent in the peripheral direction.

3. The hydraulic power steering apparatus as claimed in claim 2, wherein the width in the diametrical direction of the sidable contact portion becomes larger in proportion as it goes closer to the coupling portion from both end portions of the sidable contact portion in the peripheral direction.

4. The hydraulic power steering apparatus as claimed in claim 3, wherein the width in the diametrical direction of the coupling portion is larger than the minimum value of the width in the peripheral direction of the coupling portion, and is smaller than the width in the diametrical direction of a connecting portion of the sidable contact portion and the coupling portion.

5. The hydraulic power steering apparatus as claimed in claim 4, wherein a rate of the width in the axial direction of the slidable contact surface with respect to the width in the peripheral direction of the sidable contact surface is greater than or equal to 1 and less than 2.

6. The hydraulic power steering apparatus as claimed in claim 3, wherein a rate of the width in the axial direction of the sidable contact surface with respect to the width in the peripheral direction of the sidable contact surface is greater than or equal to 1 and less than 2.

7. The hydraulic power steering apparatus as claimed in claim 2, wherein the width in the diametrical direction of the coupling portion is larger than the minimum value of the width in the peripheral direction of the coupling portion, and is smaller than the width in the diametrical direction of a connecting portion of the sidable contact portion and the coupling portion.

8. The hydraulic power steering apparatus as claimed in claim 7, wherein a rate of the width in the axial direction of the sidable contact surface with respect to the width in the peripheral direction of the sidable contact surface is greater than or equal to 1 and less than 2.

9. The hydraulic power steering apparatus as claimed in claim 2, wherein a rate of the width in the axial direction of the sidable contact surface with respect to the width in the peripheral direction of the slidable contact surface is greater than or equal to 1 and less than 2.

10. The hydraulic power steering apparatus as claimed in claim 1, wherein the width in the diametrical direction of the sidable contact portion becomes larger in proportion as it goes closer to the coupling portion from both end portion of the sidable contact portion in the peripheral direction.

11. The hydraulic power steering apparatus as claimed in claim 10, wherein the width in the diametrical direction of the coupling portion is larger than the minimum value of the width in the peripheral direction of the coupling portion, and is smaller than the width in the diametrical direction of a connecting portion of the sidable contact portion and the coupling portion.

12. The hydraulic power steering apparatus as claimed in claim 11, wherein a rate of the width in the axial direction of the sidable contact surface with respect to the width in the peripheral direction of the sidable contact surface is greater than or equal to 1 and less than 2.

13. The hydraulic power steering apparatus as claimed in claim 3, wherein a rate of the width in the axial direction of the slidable contact surface with respect to the width in the peripheral direction of the sidable contact surface is greater than or equal to 1 and less than 2.

14. The hydraulic power steering apparatus as claimed in claim 1, wherein the width in the diametrical direction of the coupling portion is larger than the minimum value of the width in the peripheral direction of the coupling portion, and is smaller than the width in the diametrical direction of a connecting portion of the slidable contact portion and the coupling portion.

15. The hydraulic power steering apparatus as claimed in claim 14, wherein a rate of the width in the axial direction of the sidable contact surface with respect to the width in the peripheral direction of the slidable contact surface is greater than or equal to 1 and less than 2.

16. The hydraulic power steering apparatus as claimed in claim 1, wherein a rate of the width in the axial direction of the sidable contact surface with respect to the width in the peripheral direction of the sidable contact surface is greater than or equal to 1 and less than 2.

17. The hydraulic power steering apparatus as claimed in claim 1, wherein the base body portion is formed in a columnar shape, and the guide portion is constituted by three blade-shaped portions provided so as to protrude to an outer side in a diametrical direction from an outer peripheral surface of the base body portion at a uniform interval in the peripheral direction.

18. The hydraulic power steering apparatus as claimed in claim 1, wherein the width in the peripheral direction of the sidable contact surface is approximately eightfold of the width in the peripheral direction of the coupling portion.

19. The hydraulic power steering apparatus as claimed in claim 1, wherein a cross sectional shape of the coupling portion and the sidable contact portion is a line symmetrical shape in which a straight line passing through the center axis is set to a common symmetrical line, and a cross sectional shape including the slidable contact surface in the guide portion is an approximately T shape, and the sidable contact portion is formed in the same cross sectional shape over an entire of the axial direction.

* * * * *